US005214006A

United States Patent [19]

Langenohl

[11] Patent Number: 5,214,006

[45] Date of Patent: May 25, 1993

[54] CEMENT-FREE SILICON CARBIDE MONOLITHS

[75] Inventor: Mark C. Langenohl, Pleasant Hills, Pa.

[73] Assignee: Indresco Inc., Dallas, Tex.

[21] Appl. No.: 821,507

[22] Filed: Jan. 15, 1992

Related U.S. Application Data

[63] Continuation-in-part of Ser. No. 650,530, Feb. 5, 1991, abandoned.

[51] Int. Cl.[5] .............................................. C04B 35/56

[52] U.S. Cl. ...................................... 501/89; 501/129; 106/38.27

[58] Field of Search ................. 501/89, 129, 127, 128; 106/14.21, 38.27

[56] References Cited

U.S. PATENT DOCUMENTS

| | | | |
|---|---|---|---|
| 2,205,308 | 6/1940 | Pirani | 501/89 X |
| 3,329,514 | 7/1967 | Saunders et al. | 501/89 |
| 4,162,179 | 7/1979 | Campanis | 501/129 X |
| 4,800,181 | 1/1989 | Lassiter et al. | 501/89 |

FOREIGN PATENT DOCUMENTS

| | | |
|---|---|---|
| 3002868 | 1/1987 | Japan . |
| 2119164 | 5/1987 | Japan . |

*Primary Examiner*—Mark L. Bell

*Assistant Examiner*—Chris Gallo

[57] ABSTRACT

A lime-free silicon carbide based refractory containing about 87 wt.% silicon carbide sized −10 mesh, about 5 wt.% alumina sized −325 mesh, about 3 wt.% silica sub-micron size, and about 5 wt.% alkaliphosphate modified alumino-silicate binder. This material finds particular applicability in the construction of cast shapes and troughs for non-ferrous metal production and as a refractory lining for boiler tubes.

10 Claims, No Drawings

CEMENT-FREE SILICON CARBIDE MONOLITHS

CROSS-REFERENCE TO RELATED APPLICATIONS

This application is a continuation-in-part of copending U.S. patent Application Ser. No 07/650,530, filed Feb. 5, 1991, now abandoned and having the same title and inventor as the present application.

BACKGROUND OF THE INVENTION

This invention relates to silicon carbide based monoliths and, more particularly, it concerns a lime-free silicon carbide refractory which can be used in various non-ferrous applications, such as aluminum production, ferroalloy production, tin production, copper production, and also as a refractory covering for boiler tubes.

It is recognized that the highest wear and maintenance area in an aluminum reverberatory furnace is the belly band area. This area comprises the fluctuating zone between molten metal and air. The belly band zone is subjected to corundum ($Al_2O_3$) buildup. (due to oxidation of the metal), reactions between the refractory and the molten metal, reactions between the refractory and cover fluxes on the molten metal, mechanical scrapping to remove the tough corundum buildup, and high combustion temperatures since a gas flame is directed onto the surface of the molten bath. As the belly band area becomes worn or eroded, the upper sidewall of the furnace becomes undercut and hence becomes unstable. This necessitates bringing the furnace off line and repairing the belly band. Current refractory materials used to line the belly band are phosphate bonded high alumina brick and monoliths as well as zircon brick. Although these materials perform reasonably well, localized wear at the belly band is a problem. Hence, there is an ongoing need for a more durable and stable belly band refractory.

Ferroalloys, such as 75 wt.% Si/25 wt.%Fe are typically formed in submerged arc furnaces. In such a furnace, the temperature of the molten ferroalloy is very high, typically near 3200-3300° F. The molten alloys are tapped from the furnace and poured through troughs into receiving ingots. The troughs are typically made from cement bonded 60 wt.% SiC/alumina castables. The castables are typically cast into rectangular shapes about 37×17⅝×6". Carbon paste is then rammed over the rectangular shapes to form a trough-shaped configuration. These carbon troughs protect the blocks from the effects of the initial heat. Even though this carbon trough lining material works reasonably well, a more durable and stable refractory is desired.

In waste-to-energy incinerators, boiler tubes filled with cooling water are used to transfer heat from the confines of the incinerator. Boiler tubes are used to construct the walls of the combustion chamber in the incinerator. Because the boiler tubes cannot withstand direct contact with the high temperatures in the interior of the incinerator, they are lined with a high conductivity refractory. Historically, silicon carbide-based refractories have been used for this purpose. These refractories have been bonded with silicates, phosphates, or calcium aluminate cements. While surface life has been adequate, a longer refractory life of the boiler tube lining is desired.

SUMMARY OF THE INVENTION

In accordance with the present invention, the aforementioned shortcomings and limitations of conventional refractories for the described applications have been substantially overcome by development of a lime-free silicon carbide composition.

In accordance with a preferred embodiment, the invention encompasses either a mix or a cast shape containing about 87 wt.% silicon carbide graded −10 mesh, about 5 wt.% fine alumina, about 3 wt.% fine silica, and about 5 wt.% alkali phosphate modified alumino-silicate. This composition may also contain additions of common aluminum penetration inhibitors, such as about 5 wt.% of a baria-based compound and about 3 wt.% of a borosilicate compound. These additions are added at the expense of the fine silicon carbide addition.

Accordingly, a principal object of the present invention is to provide a cement-free silicon carbide based refractory adapted for use in non-ferrous applications. Another and more specific object of the invention is the provision of such a refractory which is useful as a refractory covering for boiler tubes. Other objects and further scope of applicability of the present invention will become apparent from the detailed description to follow.

DETAILED DESCRIPTION OF THE PREFERRED EMBODIMENT

In accordance with an exemplary embodiment, the present invention encompasses either a mix or a cast shape containing about 87 wt.% silicon carbide graded−10 mesh, about 5 wt.% fine alumina, about 3 wt.% fine silica, and about 5 wt.% alkali phosphate modified alumino-silicate binder. In accordance with a preferred embodiment, the binder is a commercially available product sold under the tradename Lithopix AS-85.

The present mix or shape may also contain additions of common aluminum penetration inhibitors, such as about 5 wt.% of a baria-based compound and about 3 wt.% of a borosilicate compound. These additions are added at the expense of the fine silicon carbide addition.

Table 1 outlines a portion of the mix development aimed at finding an improved refractory for troughs used in ferroalloy applications. Mixes 1 to 4 evaluated the effect of grind (+10 mesh grains versus−10 mesh grains) and the effect of calcined versus reactive alumina. All mixes were made with the same amount of fine silica and alkali phosphate aluminosilicate binder (Lithopix AS 85). From this study, it was concluded that the best strength after reheating was obtained with mix 3. This mix had a −10 mesh grind and contained reactive alumina.

Mixes 5 and 6 contained the preferred−10 mesh grind and reactive alumina but were made with two levels of dry phosphate powder and inorganic silicate hardener instead of the Lithopix AS 85 binder. These two mixes had significantly lower densities and strengths. Strength was particularly low after reheating to 2500° F. This effort indicated that the desired properties of high density and high strength were primarily influenced by the Lithopix AS 85 binder instead of the grind or type of alumina addition.

TABLE 1

| Mix: | 1 | 2 | 3 | 4 | 5 | 6 |
|---|---|---|---|---|---|---|
| SiC, 6/10 | 26.6 wt. % | 26.6 wt. % | — | — | — | — |
| SiC, 10/16 | 21.4 | 21.4 | 34.0 wt. % | 34.0 wt. % | 34.0 wt. % | 34.0 wt. % |
| SiC, 16/30 | — | — | 12.5 | 12.5 | 12.5 | 12.5 |
| SiC, 30/50 | 10.2 | 10.2 | 13.8 | 13.8 | 13.8 | 13.8 |
| SiC, −100 | 18.8 | 18.8 | 13.0 | 13.0 | 13.0 | 13.0 |
| SiC, −200 | 10.0 | 10.0 | 13.7 | 13.7 | 12.7 | 10.7 |
| Fine Calcined Alumina | 5.0 | — | — | 5.0 | — | — |
| Fine Reactive Alumina | — | 5.0 | 5.0 | — | 5.0 | 5.0 |
| Fine Silica | 3.0 | 3.0 | 3.0 | 3.0 | 3.0 | 3.0 |
| Lithopix AS 85 | 5.0 | 5.0 | 5.0 | 5.0 | — | — |
| Dry Mono-Aluminum Phosphate Powder | — | — | — | — | 3.0 | 4.0 |
| Inorganic Silicate Hardening Agent | — | — | — | — | 3.0 | 4.0 |
| % Water for Casting | 6.5 | 6.5 | 6.5 | 6.7 | 6.4 | 6.7 |
| Bulk Density, pcf, After 250° F. | 156 | 159 | 158 | 154 | 147 | 144 |
| Modulus of Rupture, psi | | | | | | |
| After 250° F. | 530 | 620 | 630 | — | — | — |
| After 1500° F. Reheat | 1810 | 2170 | 2450 | 1530 | 250 | 200 |
| After 2500° F. Reheat | 5520 | 4820 | 5780 | 5450 | 2510 | 2060 |
| At 2000° F. | 3650 | 4950 | 5310 | — | — | — |
| At 2500° F. | 600 | 760 | 740 | — | — | — |
| At 2700° F. | — | — | — | — | — | 25 |
| Cold Crushing Strength, psi | | | | | | |
| After 250° F. | 2890 | 3580 | 3810 | — | — | — |
| After 1500° F. | 4740 | 5850 | 6070 | 5520 | 760 | 710 |
| After 2500° F. | 13880 | 14690 | 17020 | 15420 | 4510 | 5230 |
| Apparent Porosity, % | | | | | | |
| After 250° F. | 20.6 | 19.4 | 19.7 | — | — | — |
| After 1500° F. | 22.1 | 20.1 | 20.6 | — | — | — |
| Linear Change, % | | | | | | |
| After 1500° F. | 0.0 | 0.0 | 0.0 | 0.0 | 0.0 | 0.1 |
| After 2500° F. | 0.0 | +0.3 | +0.2 | 0.0 | +0.1 | +0.2 |
| Volume Change, % | | | | | | |
| After 1500° F. | −0.7 | +0.3 | −0.3 | −0.5 | −2.7 | −1.2 |
| After 2500° F. | +2.4 | +2.4 | +2.4 | +0.1 | −0.6 | +1.8 |
| ASTM C-704 Abrasion Test Volume Loss in cc, After Reheating to 1500° F. | 12 | 8 | 15 | — | — | — |

Cast rectangular shapes of mix #3 were made measuring about $37\times17\frac{5}{8}\times6''$. These shapes were used to construct the trough used to transport molten ferrosilicon to receiving ingot molds. Field trials indicate the lime-free 87 wt.% SiC composition outperformed the standard cement bonded 60 wt.% SiC/alumina cast shapes. Since this initial trial was successful, it was decided to cast a complete trough using the lime-free SiC mix. For economic reasons, the lower half of the trough which is not exposed to the metal stream was made from a typical cement bonded 70 wt.% alumina castable and the upper half was made from the more expensive lime-free 87 wt.% SiC mix. The cast trough was then covered with carbon paste to provide protection during the initial heat up. A further advantage of this design is that the upper portion of the used trough can be easily removed and replaced with a new insert. This ability further decreases the cost of maintaining the trough. Two field trials were held utilizing this new design and both trials were deemed successful.

It is contemplated that similar troughs incorporating the lime-free 87 wt.% SiC mix can be used in the pouring of molten tin and in other shops which pour molten copper. Additional proposed applications for this material include cast tiles for use as refractory covers on boiler tubes.

Table 2 outlines development of the lime-free SiC mix for use in the belly band zone of aluminum furnaces. Mix A in Table 2 is the standard mix developed for use in ferroalloy troughs. Mixes B to H contain additions of common aluminum penetration inhibitors such as a baria-based compound and a borosilicate based compound. These additives are well known in the art. The addition of these compounds increased density and the strength of the material especially strength after exposure to 1500° F. A comparison of mixes B and C suggest that removal of the finest SiC component had a favorable effect on the water requirement of the mix. In this series, mix G had the best set of physical properties as well as a relatively low raw stock cost.

TABLE 2

| Mix: | A | B | C | D | E | F | G | H |
|---|---|---|---|---|---|---|---|---|
| SiC, 6/10 | — | — | — | — | — | — | — | 42 wt. % |
| SiC, 10/16 | 45 wt. % | 44 wt. % | 44 wt. % | 42 wt. % | 44 wt. % | 44 wt. % | 44 wt. % | — |
| SiC, 16/30 | — | — | — | — | — | — | — | 11 |
| SiC, 30/50 | 15.5 | 13 | 13 | 11 | 13 | 13 | 13 | 6 |
| SiC, −100 | 13 | 11 | 11 | 12 | 11 | 11 | — | — |
| SiC, −200 | 13.5 | 11 | — | — | — | — | — | — |
| Fused Alumina, 50% −325 mesh | — | — | 11 | 12 | 11 | 12 | 28 | 21 |
| Barium-Based Inhibitor | — | 5 | 5 | 10 | 5 | 5 | 5 | 5 |
| Borosilicate-Based Compound | — | 3 | 3 | — | 3 | 3 | 3 | 3 |
| Fine Calcined Alumina | — | — | — | — | 5 | 5 | 5 | 5 |
| Fine Reactive Alumina | 5 | 5 | 5 | 5 | — | — | — | — |
| Fine Silica | 3 | 3 | 3 | 3 | 3 | 3 | 3 | 3 |

TABLE 2-continued

| Mix: | A | B | C | D | E | F | G | H |
|---|---|---|---|---|---|---|---|---|
| Lithopix AS 85 | 5 | 5 | 5 | 5 | 5 | 4 | 4 | 4 |
| % Water for Casting | 6.2 | 6.0 | 4.6 | 4.4 | 4.7 | 4.8 | 4.9 | 4.8 |
| Bulk Density, pcf | | | | | | | | |
| After 250° F. | 155 | 156 | 164 | 167 | 164 | 163 | 167 | 168 |
| After 1500° F. Reheat | 154 | 157 | 164 | 168 | 164 | 164 | 166 | 168 |
| Modulus of Rupture, psi | | | | | | | | |
| After 250° F. | 1310 | 1300 | — | 2080 | — | — | — | — |
| After 1500° F. Reheat | 2610 | 2880 | 2900 | 2690 | 2910 | 2430 | 1920 | 2280 |
| At 1500° F. | 2600 | 3620 | 6170 | 3510 | 7280 | 6600 | 6750 | 5570 |
| Cold Crushing Strength, psi | | | | | | | | |
| After 250° F. | 3380 | 3040 | — | 6360 | — | — | — | — |
| After 1500° F. | 5870 | 6370 | 7460 | 10870 | 7150 | 6910 | 6790 | 7810 |
| 1500° F. Reheat | | | | | | | | |
| % Linear Change | 0.0 | −0.1 | −0.1 | 0.0 | −0.1 | 0.0 | −0.2 | −0.2 |
| % Volume Change | 0.0 | −0.5 | −0.1 | 0.0 | −0.2 | −0.3 | +0.5 | −0.3 |
| ASTM C-704 Abrasion Test After 1500° F. Reheat Volume Eroded, cc | — | — | 3.8 | — | 3.9 | 5.4 | 4.9 | 4.3 |

Table 3 provides a screen analysis of mixes 1-6 of Tables 1 and mixes A-H of Table 2.

TABLE 3

| | Screen Analysis | | | |
|---|---|---|---|---|
| Table: | 1 | | 2 | |
| Mixes: | 1 & 2 | 3 to 6 | A to G | H |
| % Held on +10 mesh | 36 ± 3 | 15 ± 3 | 15 ± 3 | 42 ± 3 |
| 10/28 mesh | 12 | 30 | 30 | 12 |
| 28/65 mesh | 10 | 15 | 15 | 8 |
| −65 mesh | 42 ± 3 | 40 ± 3 | 40 ± 3 | 38 ± 3 |

With reference to Table 4, tests on shapes cast from mix G indicated this composition has a very good resistance to molten aluminum.

TABLE 4

| Molten Aluminum Test | | |
|---|---|---|
| Mix: | | G |
| Alcoa's 72 hr Aluminum Cup Test Using 7075 Alloy at 1500° F. | | |
| Aluminum Penetration: | | None |
| Aluminum Adherence: | | Moderate |
| | Change in Metal Chemistry | Maximum Allowable Increase |
| Silicon (Si) | −0.09 | +0.50 |
| Iron (Fe) | 0.0 | +0.10 |
| Magnesium (Mg) | −0.48 | — |

Mixes and cast shapes without the aluminum penetration inhibitors have found successful application in troughs used to transfer molten ferroalloys. This composition presumably will be effective also in tin and copper applications. The mix or cast shapes with aluminum penetration inhibitors should find application in the belly band zone of aluminum reverberatory furnaces.

It is preferred that the silicon carbide in this invention should have a silicon carbide content of at least 90 wt.% preferably 95 wt.% SiC or higher and that the density of the grain should be at least 2.5 g/cc, preferably 2.9 g/cc and higher.

Also, in accordance with a preferred embodiment, the fine alumina addition should be essentially −150 mesh, preferably −325 mesh. The alumina can be ground calcined alumina or super ground reactive alumina. The alumina content of this powder should be at least 98 wt.%, preferably higher. The fine silica addition should be −325 mesh, preferably submicron. Ideally, this addition should be round or spherical to enhance the flow properties of the castable. The Lithopix AS 85 additive should be sized −150 mesh and have a typical chemical analysis as shown in Table 5.

TABLE 5

| Chemical Analysis of Lithopix AS 85 | |
|---|---|
| $SiO_2$ | 59.7 wt. % |
| $Al_2O_3$ | 25.2 |
| $TiO_2$ | 0.01 |
| $Fe_2O_3$ | 0.06 |
| CaO | 0.05 |
| MgO | 0.08 |
| $P_2O_5$ | 8.20 |
| $Na_2O$ | 0.17 |
| $K_2O$ | 8.15 |
| Total Analyzed | 99.8% |

One means of achieving longer refractory life of boiler tube refractory linings is to increase the silicon carbide content of the refractory. This has been accomplished in accordance with the current invention by use of an alkali-phosphate modified aluminum silicate binder.

Thus, it will be appreciated that as a result of the present invention, a highly effective lime-free silicon carbide refractory is provided by which the principal object and others are completely fulfilled. It is contemplated and will be apparent to those skilled in the art from the foregoing description that variations and/or modifications of the disclosed embodiment may be made without departure from the invention. Accordingly, it is expressly intended that the foregoing description is illustrative of a preferred embodiment only, not limiting, and that the true spirit and scope of the present invention be determined by reference to be appended claims.

What is claimed is:

1. A cement-free cast shape for use in the ferroalloy industry, consisting essentially of about 70 to 97 wt.% silicon carbide, graded -10 mesh and finer; 1 to 10 wt.% fine alumina; 1 to 10 wt.% fine silica; and 1 to 10 wt.% alkali phosphate modified alumino-silicate powder.

2. The cast shape according to claim 1, wherein said fine alumina is sized −325 mesh.

3. The cast shape according to claim 2, wherein said fine silica is sized sub-micron.

4. A cement-free mix for use in the ferroalloy industry, consisting essentially of about 70 to 97 wt.% silicon carbide, graded −10 mesh and finer; 1 to 10 wt.% fine alumina, I to 10 wt.% fine silica, and 1 to 10 wt.% alkali phosphate modified alumino-silicate powder.

5. The mix according to claim 4, wherein said fine alumina is sized −325 mesh.

6. The mix according to claim 5, wherein said fine silica is sized sub-micron.

7. A cement-free cast shape consisting essentially of about 70 to 97 wt.% silicon carbide, graded −10 mesh and finer; 1 to 10 wt.% fine alumina, 1 to 10 wt.% fine silica, 1 to 10 wt.% alkali phosphate modified alumino-silicate powder; and 1 to 15 wt.% aluminum penetration inhibitors.

8. The cast shape according to claim 7, wherein said aluminum penetration inhibitors include about 5 wt.% of a baria-based compound and about 3 wt.% of a borosilicate compound.

9. A cement-free mix consisting essentially of about 70 to 97 wt.% silicon carbide, graded −10 mesh and finer; 1 to 10 wt.% fine alumina, 1 to 10 wt.% fine silica, 1 to 10 wt.% alkali phosphate modified aluminosilicate powder; and 1 to 15 wt.% of aluminum penetration inhibitors.

10. The mix according to claim 9, wherein said aluminum penetration inhibitors include about 5 wt.% of a baria-based compound and about 3 wt.% of a borosilicate compound.

* * * * *